(12) United States Patent
Kehne et al.

(10) Patent No.: US 7,386,759 B2
(45) Date of Patent: *Jun. 10, 2008

(54) METHOD OF PERFORMING FUNCTIONAL VALIDATION TESTING

(75) Inventors: Kevin Gene Kehne, Austin, TX (US); Claudia Andrea Salzberg, Austin, TX (US); Steven Joseph Smolski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 461 days.

This patent is subject to a terminal disclaimer.

(21) Appl. No.: 11/044,553

(22) Filed: Jan. 27, 2005

(65) Prior Publication Data

US 2006/0168476 A1    Jul. 27, 2006

(51) Int. Cl.
*G06F 11/00* (2006.01)
(52) U.S. Cl. .............................. 714/6; 714/11; 714/12
(58) Field of Classification Search ............... None
See application file for complete search history.

(56) References Cited

U.S. PATENT DOCUMENTS

| | | | | |
|---|---|---|---|---|
| 4,654,819 A | * | 3/1987 | Stiffler et al. ............. 711/162 |
| 5,727,144 A | * | 3/1998 | Brady et al. ............... 714/6 |
| 5,996,091 A | * | 11/1999 | Jones et al. ............... 714/37 |
| 6,772,310 B2 | * | 8/2004 | Thompson et al. ......... 711/166 |
| 6,928,638 B2 | * | 8/2005 | Parvathala et al. ........ 717/124 |
| 7,216,185 B2 | * | 5/2007 | Kato ....................... 710/52 |
| 7,231,562 B2 | * | 6/2007 | Ohlhoff et al. ............ 714/718 |
| 2006/0155897 A1 | * | 7/2006 | Kehne et al. ............. 710/55 |

* cited by examiner

*Primary Examiner*—Christopher S McCarthy
(74) *Attorney, Agent, or Firm*—Volel Emile; Robert M. Carwell; D'Ann N. Rifai

(57) ABSTRACT

A system, apparatus, computer program product and method of performing functional validation testing in a system are provided. Generally, functional validation testing includes data acquisition and data validation testing. During the functional validation testing two devices may be exchanging data. The exchange of data by the two devices may be referred to as data acquisition. The data from one device and the data from the other device may be compared to each other. This may be referred to as data validation. When data is exchanged during data acquisition, it is also stored in appropriate locations in a pool of buffers in memory. During the data acquisition, checks are made to determine if the system is entering an idle cycle. If so, the data validation test is performed by using the data in the pool of buffers in memory.

5 Claims, 4 Drawing Sheets

METHOD OF PERFORMING FUNCTIONAL VALIDATION TESTING

BACKGROUND OF THE INVENTION

1. Technical Field

The present invention is directed to functional validation testing. More specifically, the present invention is directed to a system, apparatus, computer program product and method of continuing functional validation testing even after one of the devices involved in performing the test becomes inaccessible.

2. Description of Related Art

After an integrated circuit (IC) has been designed and fabricated, it usually undergoes an array of tests to ensure that it functions as intended. This array of tests is usually referred to as functional validation testing.

Functional validation testing generally entails data acquisition and validation. For example, if data is being transacted between two devices (i.e., data acquisition), then it has to be validated. To validate the data, the data has to be read from the source device and from the destination device and compared. If the data read from the two devices are the same the test passes; otherwise it fails.

When, during the functional validation testing, one of the devices becomes inaccessible, the test may have to be suspended since accessibility to both devices is required. In such a case, therefore, the functional validation testing becomes that much more prolonged.

Thus, what is needed is a system, apparatus, computer program product and method of continuing functional validation testing even after one of the devices involved in performing the test becomes inaccessible.

SUMMARY OF THE INVENTION

The present invention provides a system, apparatus, computer program product and method of performing functional validation testing in a system. Generally, functional validation testing includes data acquisition and data validation testing. During the functional validation testing two devices may be exchanging data. The exchange of data by the two devices may be referred to as data acquisition. The data from one device and the data from the other device may be compared to each other. This may be referred to as data validation (i.e., if the data from each of the devices is the same then the test passes and the data is said to be validated otherwise the test fails). When data is exchanged during data acquisition, it is stored in appropriate locations in a pool of buffers in memory. (The pool of buffers has a set of locations assigned to one device and a set of locations assigned to the other device.) During the data acquisition, checks are made to determine if the system is entering an idle cycle. If so, the data validation test is performed by using the data in the pool of buffers in memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
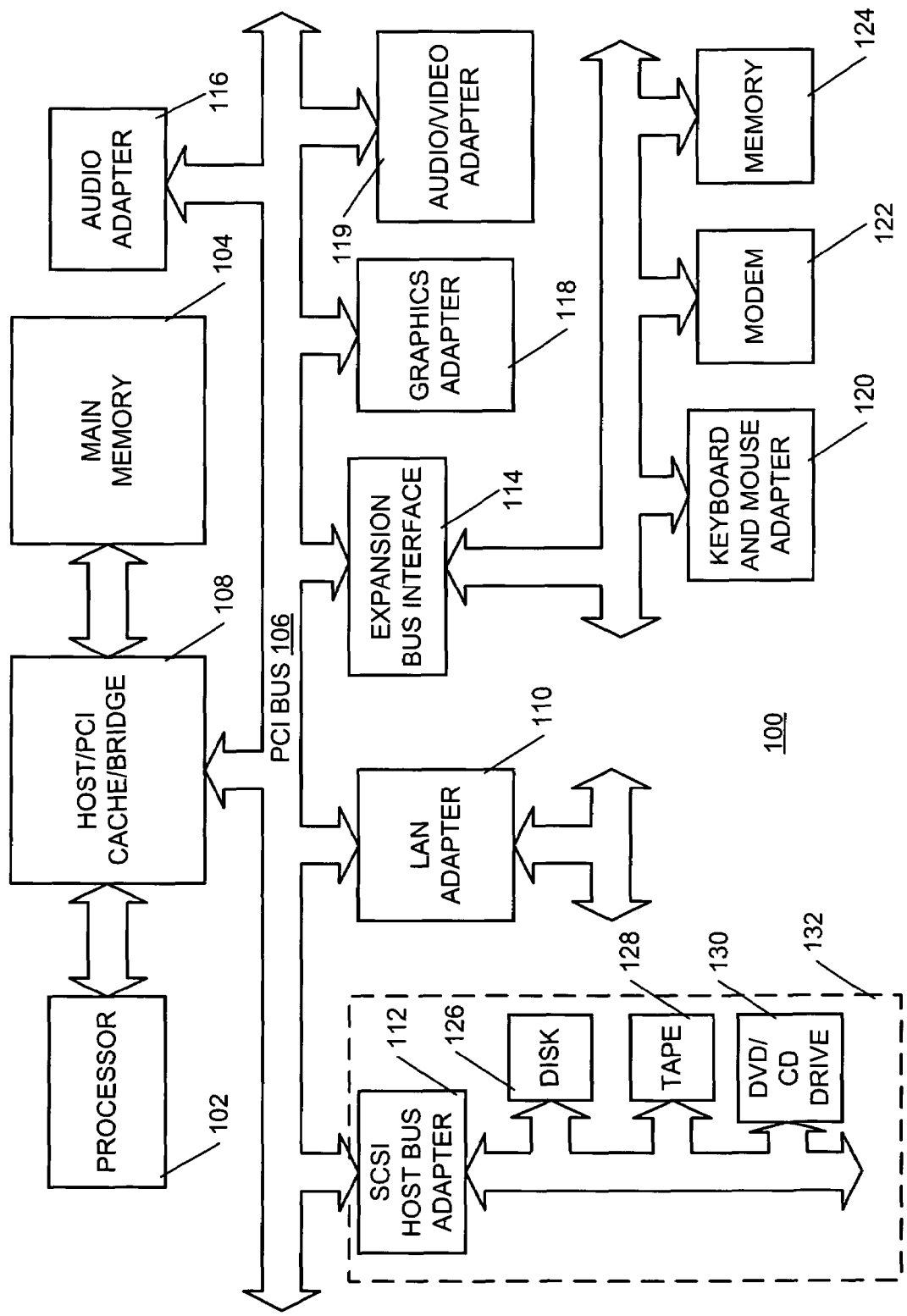
FIG. 1 depicts a block diagram of a data processing system in which the present invention may be implemented.

An operating system (OS) generally includes a scheduler. The scheduler is a software program that coordinates the use of a computer system's shared resources (e.g., a CPU). The scheduler usually uses an algorithm such as a first-in, first-out (i.e., FIFO), round robin or last-in, first-out (LIFO), a priority queue, a tree etc. algorithm or a combination thereof in doing so. For example, suppose a FIFO algorithm is used and the computer system is a uni-processor (i.e., one CPU) system. Suppose further that the computer system is executing three different programs, then the first program that is ready to be run will be scheduled to run on the processor first, the second program second and the third program last.

Note that a process is a program under execution. A program that is under execution may also be loosely referred to as a task. In most operating systems, there is at least a one-to-one relationship between a task and a program. However, some operating systems allow a program to be divided into multiple tasks or threads. Such systems are called multithreaded operating systems. For the purpose of simplicity, programs, threads and processes will henceforth be used interchangeably. Thus, the first program will be referred to as thread 1 or $Th_1$, the second program as thread 2 or $Th_2$ and the third program as thread 3 or $Th_3$.

In order to inhibit one thread from preventing other threads from running on the CPU, the scheduler assigns units of CPU time (e.g., quanta or time slices) to threads. Thus, each thread takes turns running on the CPU. Note that a quantum is typically very short in duration, but threads receive quanta so frequently that the system appears to run smoothly, even when many threads are running on the system.

When a thread is being processed by a CPU and for some reason has to wait for an event to occur before proceeding, for efficiency reasons, the process may cede the rest of its turn at the CPU to another process that is ready to run. For example, it is well known that disk input/output (I/O) is a relatively slow process. Hence, if a first process is performing disk I/O before proceeding to another task, instead of holding the processor while waiting for the disk I/O to complete, it may instead allow another process to use the CPU while waiting.

Thus, if $Th_1$ is being processed and if $Th_1$ needs to wait for an event to occur, it may cede the rest of its turn at the CPU to $Th_2$, if $Th_2$ is ready to be processed, or to $Th_3$, if $Th_3$ is instead ready to be processed. If neither $Th_2$ nor $Th_3$ is ready to be processed then $Th_1$ may cede the rest of its turn at the CPU to a process called idle. The idle process is a process that is run on a CPU when no other threads are ready to be processed by the CPU. Thus, whenever there is not a thread ready to be executed, an idle thread is dispatched for execution. Since during the time the idle thread is being processed the CPU is not doing any useful work, that time is generally referred to as an idle cycle.

The present invention proposes to use a validating device that may reserve memory areas for storing data that is being transacted and program the CPU to perform validation operations instead of running an idle thread.

With reference now to the figures, FIG. 1 depicts a block diagram of a data processing system in which the present invention may be implemented. Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. CPU 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. Small computer system interface (SCSI) host bus adapter 112 provides a connection for hard disk drive 126, tape drive 128, and CD-ROM/DVD drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system, such as Windows XP™, which is available from Microsoft Corporation. An object oriented programming system such as Java may run in conjunction with the operating system and provide calls to the operating system from Java programs or applications executing on data processing system 100. "Java" is a trademark of Sun Microsystems, Inc. Instructions for the operating system, the object-oriented operating system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1. Also, the processes of the present invention may be applied to a multiprocessor data processing system.

As another example, data processing system 100 may be a stand-alone system configured to be bootable without relying on some type of network communication interface, whether or not data processing system 100 comprises some type of network communication interface. As a further example, data processing system 100 may be a Personal Digital Assistant (PDA) device, which is configured with ROM and/or flash ROM in order to provide non-volatile memory for storing operating system files and/or user-generated data.

The depicted example in FIG. 1 is not meant to imply architectural limitations. For example, data processing system 100 may also be a notebook computer or hand held computer in addition to taking the form of a PDA. Data processing system 100 also may be a kiosk or a Web appliance.

As mentioned above, the present invention uses a validating device (not shown) that may reserve memory areas for storing data that is being transacted between two buffers (not shown) and have the CPU perform validation operations instead of going idle. Each test case that is being run will have to register with the validating device and all data buffers that need to be compared are mapped to the memory areas associated with the device. In this case, validation will occur when the test program releases the CPU. In addition, the device may interact with the test case program and interrupt the program when its own buffers (e.g., the memory areas associated with the device) are full and the data of any one of the test cases is ready to be validated. The device will then associate any failure with information necessary to understand the circumstances under which the failure occurred.

The validating device may be installed on the computer system via one of the expansion slots mentioned above. When the device is installed, it will (1) redirect the function pointer of the idle cycle to its own function; (2) map large continuous areas of the memory 104 for the test (these areas will not be capable of being paged); and (3) register an interrupt handler that will affect all test cases that it monitors.

Figure 2A:
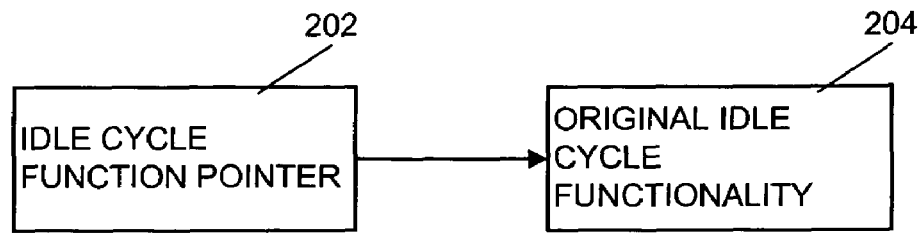
FIGS. 2a and 2b depict a state of an operating system before and after installation of the present invention, respectively.
Figure 2B:
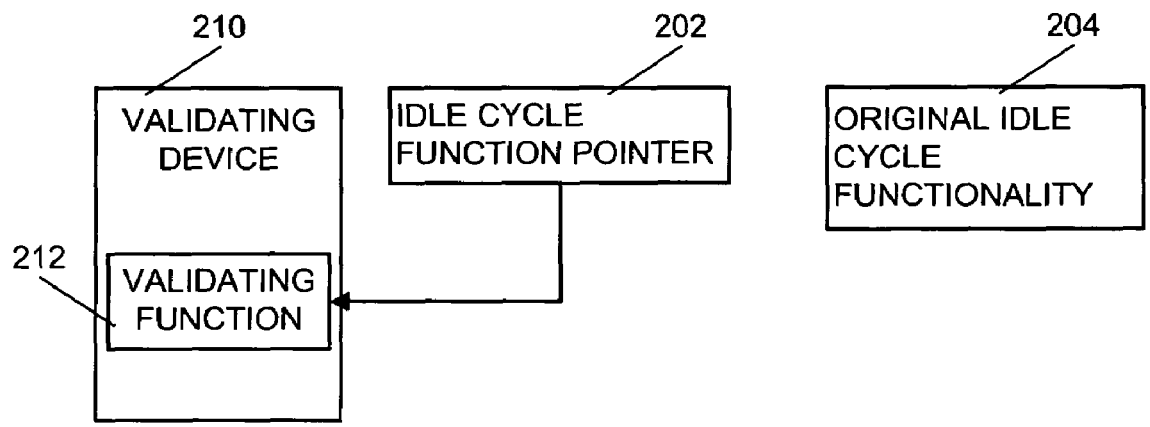

FIGS. 2a and 2b depict different states of the OS. Particularly, FIG. 2a depicts the state of the OS before the validating device is installed on the computer system and FIG. 2b depicts the state of the OS after the validating device has been installed on the system. In FIG. 2a, the idle cycle function pointer 202 points to the original idle cycle functionality 204. By contrast, in FIG. 2b, the idle cycle function pointer 202 points to the validating function 212 of the validating device 210 instead of to the original idle cycle functionality 204.

Figure 3:
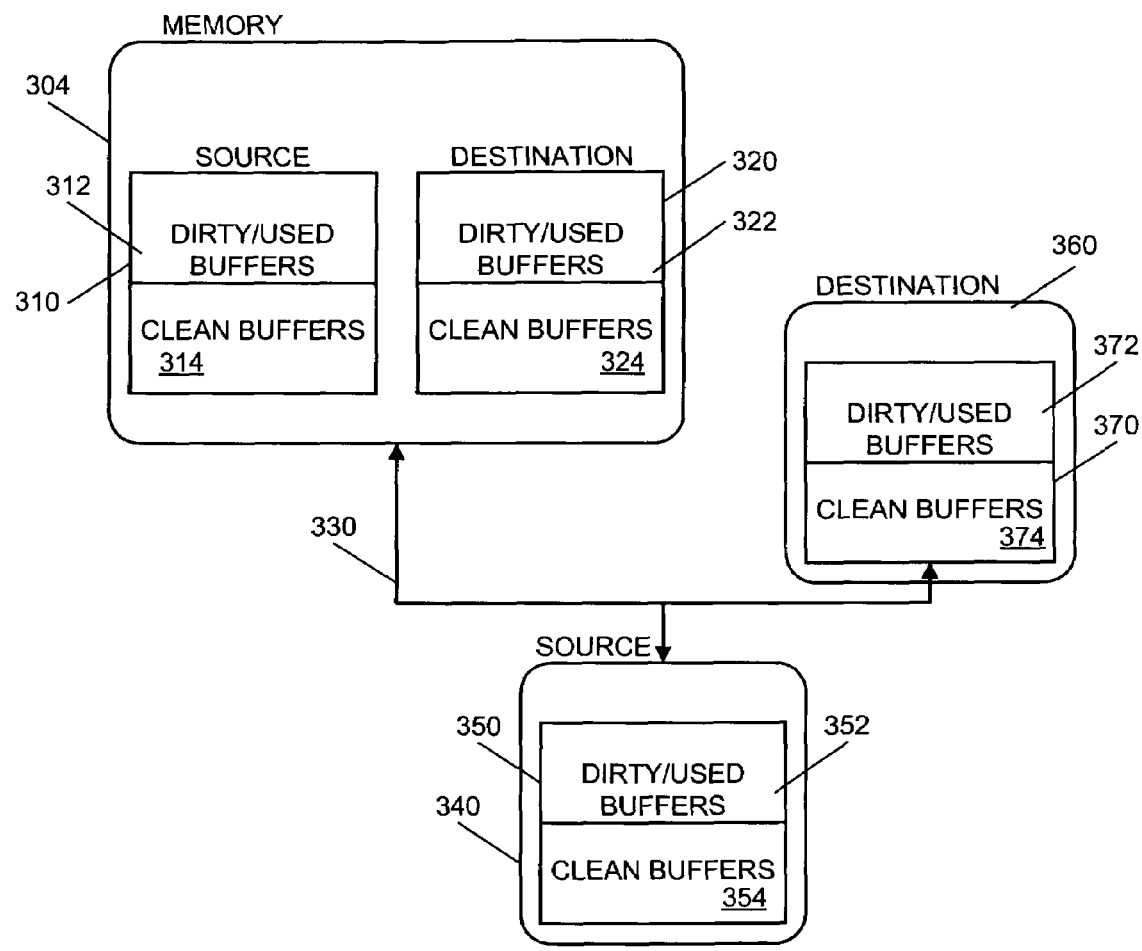
FIG. 3 depicts a conceptual view of a pool of buffers that may be maintained in memory by the present invention.

FIG. 3 depicts a conceptual view of a pool of buffers that may be maintained in memory 104 by the validating device. Note that although one pool of buffers is shown, the invention is not thus restricted. The memory 104 (or as shown in FIG. 3, the memory 304) will generally contain as many pools of buffers as there are pairs of devices exchanging data. Thus, the display of only one pool of buffers is for illustrative purposes only.

Each pool of buffers contains a source buffer and a destination buffer assigned to a source device and a destination device pair. Source device 340 is shown to be paired off with destination device 360 in FIG. 3. Buffer 310 in memory 304 which contains dirty/used buffer locations 312 and clean buffer locations 314 may correspond to buffer 350 of source device 340. As can be seen from the figure, buffer 350 contains dirty/used buffer locations 352 and clean buffer locations 354. Buffer 320 in memory 104 which contains dirty/used buffer locations 322 and clean buffer locations 324 may correspond to buffer 370 of destination device 360. As with buffer 350 of source device 340, buffer 370 in destination device 360 contains dirty/used buffer locations 372 and clean buffer locations 374.

Source device 340 uses PCI bus 330 to transfer data to and from destination device 360. New data is written into clean buffer areas 354 and/or 364 of buffers 350 and 360. Once an area has been written into, it becomes part of dirty/used areas 352 and/or 372. Modified data replaces data in the used/dirty areas 352 and 372.

The validating device may contain HW coherency/snooping logic to ensure that the pools of buffers contain identical data as buffers in the respective source/destination device pairs by snooping the PCI bus 330. This then allows the validating device to perform complete buffer validations on the pools of buffers in memory 304 when one of the buffers (i.e., buffer 350 or 370) becomes inaccessible or when, for any reason, data acquisition is suspended. Specifically, when the source buffer or the destination buffer becomes inaccessible or data acquisition is suspended, if there is not any other thread ready to be processed, the scheduler would in the past dispatch an idle thread to be processed by the CPU 102 of FIG. 1. Since however, the invention maintains a copy of the transacted data in memory 304, a test validation thread will be ready to be processed since access to the memory 304 will continue to exist. Thus, instead of going through an idle cycle, the CPU 102 may perform data validation tests.

As mentioned above, if the source and/or destination buffer that is reserved for a source device and/or destination device, respectively, becomes full, the validation device may interrupt the data acquisition that is being performed to do validation tests and free up some of the memory locations.

Note that the validation device may be either a hardware or software module. If it is a hardware module then it may be installed on the computer system 100, as mentioned above, through a PCI slot. If on the other hand, it is a software module, it may be installed on the computer system 100 as a plug-in to the OS. In either case, however, the process outlined in FIG. 4 will be followed.

Figure 4:
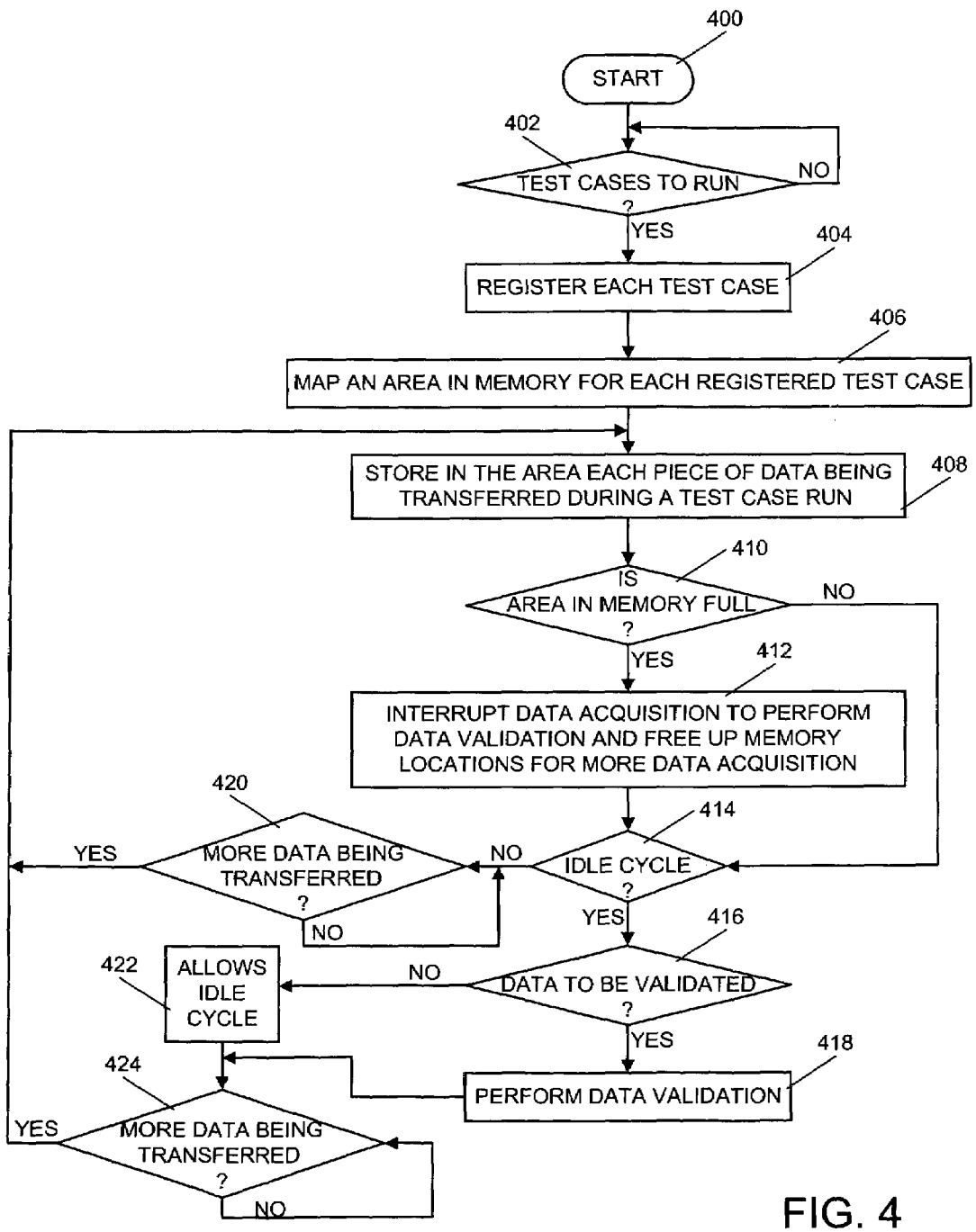
FIG. 4 is a flowchart of a process that may be used to implement the invention.

FIG. 4 is a flowchart of a process that may be used to implement the present invention. The process starts when a functional validation test is to be performed (steps 400 and 402). The test case is then registered with the invention (step 404) so that a portion of the memory may be dedicated to a pool of buffers that includes a source buffer and a destination buffer to the registered test case (step 406). As data is being transferred during the functional validation test, it is being entered in the proper locations in the source and destination buffers (step 408). After each data entry in the buffers, a test may be performed to determine whether the buffers are full (step 410). If so, the invention will interrupt the data acquisition part of the functional validation test to perform the data validation part of the test. Any data that has failed the test may be stored in another part of the memory with all needed information to understand the reason for the failure. The data that participated in the data validation test may then be deleted from the memory locations of the buffers (step 412).

If the buffers are not full, then a check may be performed to determine whether the CPU is entering an idle cycle (step 414). If so, another check may be performed to determine whether there is any data in the buffers to be validated (416). Data that is ready to be validated will be validated instead of allowing the CPU to enter the idle cycle (step 418). If there is not any data to be validated, the CPU will be allowed to enter the idle cycle (step 422). After the data validation has been performed or after the CPU has entered the idle cycle, a test will be performed to determine whether data is being transferred (steps 420 and 424). If there is data being transferred, the process may jump back to step 408. Otherwise, the process may remain in step 420 or step 424. The process may end when the computer system is turned off or is reset or when there is not any functional validation testing being performed.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of performing functional validation testing in a system, the functional validation testing including a data acquisition and a data validation test, the method comprising the steps of:
    setting up a pool of buffers in memory, the pool of buffers having a set of locations assigned to a first device, a set of locations assigned to a second device, the first and second device exchanging data during the data acquisition;
    entering each piece of data being exchanged by the first and the second device in memory in appropriate locations in the pool of buffers;
    determining whether the system is entering an idle cycle; and
    performing the data validation test by using the data in the pool of buffers in memory if it is determined that the system is entering an idle cycle.

2. The method of claim 1 wherein if the data fails the data validation test, the failed data is stored in a different area of memory with all information needed to understand why the test failed.

3. The method of claim 2 wherein the system may enter an idle cycle when there is one test being performed and the first or the second device becomes inaccessible while exchanging data during the data acquisition part of the functional validation test.

4. The method of claim 2 further including a step of determining whether the pool of buffers has become full during the data acquisition of the functional validation test and a step of interrupting the data acquisition to perform the data validation test if it is determined that the pool of buffers has become full.

5. The method of claim 4 wherein data used during the data validation is deleted from the pool of buffers.

* * * * *